United States Patent Office 3,574,021
Patented Apr. 6, 1971

3,574,021
PROCESS FOR MAKING A THREE-LAYER
POROUS LEATHER SUBSTITUTE
Edward C. Van Buskirk, South Bend, Ind., assignor to
Uniroyal, Inc., New York, N.Y.
No Drawing. Continuation-in-part of application Ser. No.
340,497, Jan. 27, 1964. This application Feb. 26, 1969,
Ser. No. 802,636
Int. Cl. B23b 5/18
U.S. Cl. 156—79                                 6 Claims

ABSTRACT OF THE DISCLOSURE

A novel, breathable, leather-like three-layer laminate is produced having a fabric backing layer, an intermediate breathable sponge layer and an upper breathable surface layer by a method in which a substantially uniform mixture of a fluid organic plastic film forming material and a meltable material incompatible therewith is formed into a thin surface layer, there is formed on the thin layer a thicker body layer from a substantially uniform mixture of a fluid organic plastic film forming material containing a meltable material incompatible therewith and a blowing agent, with said incompatible meltable material in each said layer being in a physical form having a bulk density less than its actual density, a fabric is applied to the body layer, the film forming material in the two layers is formed into a unitary film bonded to the fabric, the body layer is sponged by decomposing a blowing agent, and the incompatible material in the two layers is melted after a matrix has been formed of the two layers.

This application is a continuation-in-part of my copending application Ser. No. 340,497, filed Jan. 27, 1964, now abandoned.

This invention relates to a novel porous laminate and to a method of making the same.

Today plastic-coated fabrics are of great interest in that they offer an opportunity of providing a laminar material which, when considered from one side of the coated fabric, has the appearance and characteristics of the plastic film, yet wherein the film is supported by the underlying fabric so that the laminate as a whole exhibits certain properties, especially considerable strength, that the plastic layer alone does not possess.

Such coated fabrics have a wide variety of uses. One of the most important current uses is the so-called "simulated leather" field, wherein such coated fabrics are used in clothing (coats, etc.), upholstering, and the like. A plastic coated fabric having an exceptionally authentic "leathery feel" is disclosed and claimed in United States patent application of Callum et al., Ser. No. 13,555, filed Mar. 8, 1960, now abandoned.

These so-called simulated leather films are widely used today in clothing, upholstery and other applications. Natural leather has a property termed "breathability," i.e., it transpires air and moisture vapor and absorbs water, and much effort has been spent to create simulated leather films which are "breathable" to the same degree as leather. United States patent applications of Dosmann, Ser. No. 289,750 filed June 21, 1963, now abandoned and Ser. No. 774,495 filed Nov. 8, 1968 disclose such films having exceptionally good breathing properties.

This invention contemplates a novel fabric and film laminate combining an exceptionally authentic "leathery feel" and exceptionally good breathing properties, as well as a process of making such laminate.

In this invention a fabric and porous thermoplastic film laminate having a leathery feel and capable of absorbing water and transpiring air and moisture vapor is made by a process which comprises first forming a thin layer from a substantially uniform mixture of a fluent organic plastic film forming material and a thermoplastic heat meltable resin incompatible therewith in which the incompatible resin is in a physical form having a bulk density less than its actual density, forming on the thin layer a thicker body layer from a substantially uniform mixture of a fluent organic plastic film forming material, a thermoplastic heat meltable resin incompatible therewith and a blowing agent in which said incompatible resin is in a physical form having a bulk density less than its actual density, applying a fabric to the surface of the body layer opposite the thin layer, forming the film forming material in the two layers into a matrix without bringing the incompatible resin to its melting point, sponging the body layer by decomposing the blowing agent, melting the incompatible resin in the two layers, and forming the film forming material in the two layers into a unitary film bonded to the fabric.

In one embodiment, a mixture of a vinyl resin plastisol or organsol and particles of an incompatible thermoplastic resin are substantially uniformly mixed together, after which the mixture is cast onto conventional casting paper by means of a reverse roll coater. The gap between the doctor roll and the transfer roll is adjusted so that the thickness of the coating on the transfer roll is controlled to produce a thin coating of the type hereinafter described. The transfer roll contacts the casting paper as the latter is fed between the transfer roll and the rubber-covered backing roll, and the thin coating on the transfer roll is transferred to the paper. This layer of resin, which is to be the surface layer, is kept thin, preferably it has an average thickness of not more than about 10 mil.

In this embodiment the casting paper, now carrying the thin layer of resin-incompatible resin mixture, is gradually run through a long, multi-zoned oven. The oven, when an organosol is used, is conveniently graduated into a number of heating zones, e.g., six, with gradually increasing temperatures of about 180° F., 205° F., 260° F., 400° F., and 420° F. The gradual increase in temperature is to prevent a too rapid boiling off of the solvent portion of the organosol. A suitable speed of travel of the carrying belt and vinyl film through this oven is 40-50 yards/minute. A desirable length of the oven for this rate of passage is 65 yards. Although the heat from the multi-zoned oven may be such as to cause the initial vinyl layer to only partially fuse, i.e. to gel, desirably this layer is completely fused in this pass. Similarly, although a melting of the incompatible material, as hereinafter described, need not necessarily be achieved at this time, it is now believed desirable for over-all processing that the temperatures used be such that this melting will occur, at least when the now-preferred polyethylene is used as the meltable material in a vinyl base.

This preferably fused layer, still adhering to the casting paper, is then put through a second reverse roller coating operation. A second uniform mixture of a vinyl resin organosol or plastisol and particles of an incompatible thermoplastic resin, which mixture also has incorporated therein a blowing agent, is metered out to the contact doctor roll and transfer roll. The transfer roll, now coated with the second mixture, contacts the casting paper on the rubber covered backing roll so that as the casting paper, thinly coated with the previously applied surface layer, passes between the backing roll and transfer roll, a body layer of the second mixture is disposed on the thin surface layer. For example, for a clothing grade material the second mixture preferably is metered over the initial thin layer at a rate between about 5 ounces per square yard and 15 ounces per square yard corresponding to an average body layer thickness ranging between about 20 and about 40 mils; in one specific embodiment for clothing use, a body layer weighing 8.7 ounces per square yard giving a finished thickness of 30 mils gives excellent results. In general thinner body layers make products especially suited to clothing and similar applications, and the thicker layers make products well suited for upholstery and the like application. Thus, even thicker body layers, up to 28 ounces corresponding to a maximum thickness of 150 mils, or heavier, may be used for upholstery applications.

A fabric backing is then placed coextensive with the wet body layer. The fabric backing is placed upon the wet body layer using an extremely light pressure, commonly referred to in this art as a "kiss" pressure, this pressure being sufficient to completely contact the fabric with the body layer, but not so great as to cause the fabric to be imbedded therein.

The casting paper along with the three-layer laminate thereon, is passed through a long oven maintained at a constant temperature of about 380° F. Again this oven is suitably 65 yards long and the rate of passage is desirably 25–30 yards/minute. This heat treatment not only fuses, i.e., fluxes, the body layer (and completes the fluxing of the surface layer if this has not theretofore been completed), but fuses the two layers together and thereby secures tight adhesion between them, and it causes the blowing agent carried by the body layer to be decomposed so that this layer becomes cellular, i.e. spongy, when cells or bubbles of gas from the decomposed blowing agent have been trapped therein. Desirably this heat treatment also causes the hereinafter described melting of the incompatible material in the body layer. It is important to note that the blowing of the blowing agent in the intermediate, or body layer is not so violent as to disturb the initial thin surface layer which rests directly against the casting paper. This thin surface layer is not marred or in any way distorted by the blowing of the body layer above it (largely because of the presence of the supporting casting paper directly beneath it), so that this thin surface layer remains flat.

The thin surface layer is "gelled," and desirably substantially completely fluxed, in the first pass through the oven. When a vinyl resin plastisol or organosol is used, this gellation occurs at at least a partial solvation of the resin in the plasticizer. During the pass of the paper with both the surface and body layer thereon through the oven the body layer is first gelled (and if the surface layer has not theretofore been gelled to this extent it too is then so gelled) sufficiently to retain the integrity of the gel during gas formation from the blowing agent and during melting of the incompatible resin. After gellation of each layer (at the appropriate pass through the oven) to the extent necessary to retain integrity during melting of the incompatible resin, the layer is thereafter heated further to melt the incompatible resin. As noted above, conveniently a melting of the incompatible resin in the surface layer occurs during the pass of the paper, carrying this layer only, through the oven, and a melting of the incompatible resin in the body layer occurs during the pass of the three layers through the oven, so the emerging product after this second pass has the vinyl resin in the two layers completely fused, or fluxed, and the two layers fused integrally together, the body layer is spongy from the decomposition of the blowing agent, and both layers are porous following the melting of the incompatible resin.

The three-layer laminate in this embodiment is now complete, and the casting paper is no longer needed for support of the film, hence the casting paper may be removed therefrom at a casting paper roll up while the three-layer laminate is rolled in its own roll.

The product is a porous laminate capable of transpiring air and moisture vapor and absorbing water. This porous laminate includes a film of resin containing a multiplicity of interconnecting voids or cavities with particles of the incompatible material disposed in said cavities, and with said incompatible particles being lesser in volumes than the volumes of the cavities they occupy i.e., the cavity in which a particle resides is larger volumetrically than the particle.

In another embodiment, a mixture of a polyhydroxy-terminated polymer and an organic diisocyanate together with particles of an incompatible heat meltable thermoplastic resin are substantially uniformly mixed together, after which the mixture is filmed out in a thin film then treated first to cure the polyurethane and then heated to melt the incompatible material. A second, similar mixture but containing a blowing agent is applied atop the first in a thicker body layer, a fabric is applied thereover after which the urethane is cured and blown and then heated to melt the incompatible resin.

Various materials may be used for the film in the porous laminates of this invention. Thermoplastic resinous materials and compounds thereof are suitable. The thermoplastic vinyl resins, such as polyvinyl chloride, or any combination thereof with any of the following resins, or any combination of the following resins: copolymers of vinyl chloride and vinyl acetate, polyvinylidene chloride, copolymers of vinyl chloride and diethyl maleate, copolymers of vinyl chloride and vinylidene chloride and compounds thereof, are preferred thermoplastic resinous materials. Polyurethanes are preferred for some applications.

Polyurethane is well known in the art. It is usually a reaction product of a polyhydroxy-terminated polymer (polyester, polyether, or the like) with an organic diisocyanate, as disclosed for example in U.S. Pat. 3,004,939, Varvaro, Oct. 17, 1961 and the references cited therein.

With respect to the conventional polyurethanes that are used in the present invention, reference may be had to U.S. Pat. 2,953,839 as disclosing starting polyesters and polyethers, and describing their reaction with polyisocyanates to make polyurethanes useful in the invention. Such polyurethane is typically derived from a polymer of molecular weight from 300 to 5000 having terminal hydroxyl groups. Such polymer may be a chain extended polyester made from a glycol, preferably a mixture of ethylene and propylene glycols, and a saturated organic dicarboxylic acid, preferably adipic acid. Usually the glycol contains from 4 to 20 carbon atoms, and the acid contains from 4 to 20 carbon atoms. An excess of the glycol over the acid is used in preparing the polyester, so that the resulting polyester contains terminal hydroxyl groups. Usually such an amount of glycol is used as to give a polyester having a hydroxyl number of 22 to 225, and preferably 36 to 75, and a low acid value less than 6 and preferably less than 1. The molecular weight of the polyester usually ranges from 1500 to 3000. In general the most suitable polyesters are chiefly linear in type with melting point levels of 90° C. or lower.

Other examples of suitable polyesters for use in preparing the polyurethane are polyethylene adipate, polyethylene adipate-phthalate, polyneopentyl sebacate, etc. If desired small amounts of tri-alcohols such as trimethylolpropane or trimethylolethane may be included in the preparation of the glycol-dicarboxylic acid polyester, and such modified forms of polyester are included within the term polyester as used herein.

As an alternative to the polyesters just described there may be used (for reaction with the polyisocyanate) one or more members of the class of elastomer-yielding polyethers. Such polyethers are typically anhydrous chain-extended polyethers possessing ether linkages (—O—) separated by hydrocarbon chains either alkyl or aryl in nature. The ether should also contain terminal groups reactive to isocyanate, such as alcoholic hydroxyl groups. Usually the polyethers used are chiefly linear in type with melting point levels of 90° C. or lower. The molecular weight may range from 500 to 5,000 (i.e., hydroxyl number of about 225 to 22), but is preferably within the range of 750 to 3,500 (i.e., hydroxyl number of about 150 to 32). Preferred polyethers may be represented by the formula $H(OR)_nOH$ where R is a lower (2–6 carbon atoms) alkylene group and $n$ is an integer such that the molecular weight falls within the range specified. Examples of polyethers used are polyethylene glycol, polypropylene glycol, polypropyleneethylene glycol, and polytetramethylene glycol. Mixtures of polyesters and polyethers may be used as well as polyesters derived from polyethers [e.g. poly(diethylene glycol adipate), poly(triethylene glycol adipate)].

Further examples of polyesters or polyethers suitable for forming polyurethanes useful in the invention are the polyesters and polyethers mentioned in U.S. Pats. 2,606,162, Coffey, Aug. 5, 1952; 2,801,990, Seeger, Aug. 6, 1958; 2,801,648, Anderson, Aug. 6, 1957; and 2,814,606, Stilmar, Nov. 26, 1957. It is desired to emphasize that the invention contemplates the use of any and all such known polyethers or polyethers suitable for reaction with an aromatic diisocyanate to yield a polyurethane capable of being cured to an elastomeric state.

The polyester or polyether is, as indicated, reacted with an aromatic diisocyanate, such as p,p'-diphenylmethane diisocyanate of toluene diisocyanate, using a considerable molar excess, commonly from a 20% to a 25% and preferably from a 50% to a 150% molar excess, of the aromatic diisocyanate over that amount which would be required to react with all of the alcoholic hydroxyl groups furnished by the polyester. In accordance with known practice, the reaction is frequently effected by mixing the polyester and the aromatic diisocyanate under anhydrous conditions either at room temperature, or at a moderately elevated temperature, to form a soluble (in methyl ethyl ketone), uncured, polyurethane which is an essentially linear polyurethane having terminal isocyanate groups.

Representative of the aromatic diisocyanates that may be mentioned, by way of non-limiting examples, are such materials as m- and p-phenylene diisocyanate, toluene diisocyanate, p,p'-diphenyl diisocyanate and 1,5-naphthalene diisocyanate, and in this category we include the aromatic-aliphatic diisocyanates such as p,p'-diphenylmethane diisocyanate. Many other aromatic diisocyanates suitable for reaction with polyesters or the like to yield polyurethanes capable of being cured to the elastomeric state are disclosed in the prior art (such as the patents referred to previously), and it is desired to emphasize that the invention embraces the use of any and all such aromatic diisocyanates.

The preferred class of urethanes are mixtures of high and low molecular weight reaction products of hydroxy terminated polyester of polyethers with diisocyanate. The polyol, di-isocyanates, catalyst, and polyethylene comprise a system that is fluid enough to pour and spread. No solvent is used in the system, since the polyol itself is a fluid. The polyurethane system is readily catalyzed to promote gel, is thermoplastic for a period sufficient to allow embossing, and becomes thermosetting after several days aging.

In a sometimes preferred vinyl resin embodiment, the vinyl resin in the mixture is in a vinyl resin plastisol prepared by dispersing finely divided vinyl resin in a plasticizer therefor, or in a diluted plastisol to which an organic diluent has been added, i.e., an organosol. The formulation of plastisols and their use are now well known by those skilled in the art; and early description thereof is contained in Modern Plastics 26, 78 (April 1949) by Perrone and Neuwrith.

The material which is to form the film of the laminate is mixed with a meltable material incompatible therewith. Various materials may be used for the meltable, incompatible material as will readily occur to those skilled in this art. Thus, for some applications certain waxes and polypropylenes may be used, but the now preferred material is polyethylene. These materials are thermoplastic and will melt upon being subjected to heat as, for example, during a fusion cycle, of a vinyl resin plastisol used for the body of the films.

Polyethylene is exceptionally well suited for the incompatible materials of this invention, because it melts between 188° F. and 230° F. This is substantially above the normal range of gel temperatures for vinyl plastisols, yet below the normal range of fusion temperatures for such plastisols. Thus, depending on the duration of exposure, vinyl plastisols normally gel in a range of about 100° F.–180° F., and fuse, i.e. completely solvate or flux, in a range of about 250° F.–360° F.

The incompatible material should be in a physical form having a bulk density less than its actual density. Desirably, the particles of incompatible material may have a mesh size between about 40 and about 250 mesh, and in the now preferred embodiments they have a mesh size between about 120 mesh and about 160 mesh. It is also desirable if the material is in the form of small particles or powders which, preferably, are irregularly shaped. These incompatible thermoplastic materials are readily available commercially in a form suitable for use in this invention. Thus powdered polyethylene in a mixture of particle sizes ranging from 40 to 230 mesh is available under the name Hi-Fax 601, powdered polyethylene having a particle size of 105 microns (approximately 140 mesh) is available under the name Microthene 620, or a mixture of particle sizes of 88–105 microns (approximately 170–140 mesh) under the name Microthene 608, and powdered polyethylene having particle sizes from 80 to 100 mesh is available under the name Alathon 10.

The particle size selected will be dictated by the properties desired in the finished product. In general the particles should be sufficiently small so as not to cause projecting bumps or humps on the surface of the finished product where this would mar its appearance, as in clothing applications. The size of the particles will also affect the moisture and air transpiration rate. The incompatible particles should be of such size that a sufficient quantity added to the base material provides for interconnecting passageways to give the desired breathability. The greater the quantity of the incompatible material, the greater the air and water permeability but the less the finished product will possess the characteristics of the base material.

The rate at which the finished material will transpire air or moisture vapor will vary depending not only upon the particle size of the incompatible material and the distribution of the incompatible particles in the body, but also upon the quantity of incompatible particles employed with a given amount of resin base. Desirably from about 10 to about 50 parts by weight of resin in the base compound are used in the body layer, and from about 10 to about 60 parts by weight of the incompatible particles per 100 parts by weight of resin in the base compound are used in the thin surface layer. Excess particles in the thin surface layer tends to produce an undesirable "weakness" or "cheesiness" in the surface layer.

As discussed herein the meltable material must be incompatible with the base material, i.e. with the material which is to form the body of the films. By "incompatible" is meant the material does not fuse with, or become homogeneous with, the base material; it is a material which does not physically or chemically combine with the base material. Where the base material is a solution of a vinyl resin and a plasticizer, i.e. a fused plastisol, an incompatible material is one which does not dissolve, or dissolve in, the vinyl resin or the plasticizer or the solvated resin. Where the base material is polyurethane, an incompatible material is one which does not dissolve, or dissolve in, the fluent uncured mixture of polyhydroxy-terminated polymer and organic diisocyanate or the cured polyurethane elastomer.

It is essential that the incompatible material have a bulk density less than its actual density. Further, it is now believed that incompatible particles which are irregular in shape result in films having improved breathability over those made with particles which are essentially round and smooth. This present belief is that, with the irregularly shaped particles dispersed in a suitable matrix, the matrix gels and the incompatible compound thereafter melts forming air cells within the gelled matrix and on fusion the air cells further interconnect, to form a continuous porous construction. For example, with vinyl resin plastisols containing meltable incompatible particles, when the mix is subjected to heat but before the mass is heated to a temperature sufficient to melt the incompatible particles, the vinyl resin plastisol is gelled, and as the temperature of the compound continues to rise to the fusion point, each particle of powdered incompatible material tends to assume a spherical shape because of the surface tensions involved. It is believed this leaves minute cavities or voids alongside the particles which become minute air cells that will form interconnecting cavities or voids and provide breathability in the film. It is desirable to effect gel, fusion of the powdered polyethylene and fusion of the vinyl plastisol at a rate wherein the gas freed in the cells of the polyethylene particles is forced out of the film through an interconnected network of the particles and cells. Overlong fusion times at elevated temperatures tend to soften the matrix and flux over the interconnecting pores, reducing the breathability.

Because of the incompatibility of the added particles with the base material, where essentially smooth and spherically shaped particles are used the lack of adhesion between the particles and the base material promotes breathability.

The minute voids and channels are made more open by kneading or by the staking commonly used in treating leather.

A now preferred average thickness of a final three-layer laminate is between about .030″ and about .070″. Laminates of these thicknesses are now preferred and are useful for clothing and some upholstery applications. For other applications I anticipate thicker or thinner laminates may be useful. In three layer laminates of these preferred thicknesses the thin surface layer has an average thickness between about 3.5 mils and 10 mils, the intermediate body layer between about 15 mils and 40 mils, and the fabric backing layer about 0.015 inch, a suitable maximum thickness. Actually, the average total laminate thickness is desirably not greater than about .070″ when the laminate is to be used for presently known upholstery, an end-use for which it is most satisfactory. If the laminate is too thick, it loses its soft, leathery hand. For clothing applications the total average laminate thickness is desirably not greater than about .055″, and a preferable average maximum surface layer thickness for clothing material is about .005″. In general, the surface layer should be at least sufficiently thick so as to provide a protective film for the intermediate body layer, and the minimum total thickness of the laminate should be sufficient to provide the desired wearing qualities for the intended end-use.

The three-layer laminates of my invention possess a remarkable leather-like feel, largely because of the presence of the body layer, and a remarkable breathability. The presence of the base fabric layer considerably enhances the strength-bearing properties of the laminate. The fabric backing may suitably be knit or woven natural or synthetic textile material. Even low thread count fabrics are suitable since the intermediate layer is thixotropic prior to the fusion-blowing step.

If desired, subsequent to stripping the completed laminate from the carrier casting belt, the surface may be given an overall slip finish. Desirably, any slip coat is put on with a discontinuous print roll, sometimes called a trihelicoid roll, which places on the surface fine diamond shaped deposits of the slip finish. The slip finish is then dried, and the coated three-layer laminate may be sent through an embossing system. The slip finish reduces somewhat the "breathability" of the film and the subsequent embossing by breaking up somewhat the slip finish tends to restore but not completely, the original breathability. Because of the delicate nature of the film, it is necessary to maintain a certain minimum separation between the embossing roll and the back-up roll in order to prevent any crushing thereof as it passes between the two rolls to be embossed. For example, for an overall thickness of 0.041 inch of the laminate it has been found necessary to separate the embossing roller from its back-up roller by about 0.024 inch. This procedure represents a departure from the convenitonal embossing of vinyl films, wherein the embossing roll and the back-up roll are positioned virtually in contact with one another.

It should be noted that three-layer laminates of my invention comprise a fabric layer upon which is mounted a coextensive body layer, over which is an additional thin, preferably pigmented, surface layer. This outer layer does not impart an undesirable stiffness to the laminate as a whole, largely because of its extreme thinness. Unlike the usual plastic-fabric laminate, which laminate invariably imparts a "plastic" feel, my laminate is leathery in nature because of the resilient body layer, and it is breathable.

The casting surface may be made of paper or any other suitable material from which the final laminate can be readily stripped. If desired, it can be coated with a conventional releasing fluid such as silicone or the like.

A plastisol is a uniform dispersion in a plasticizer of a thermoplastic resin in the form of fine particles. An organosol, when used, is similar to a plastisol, however a portion of the plasticizer is replaced with a volatile organic solvent. Both plastisols and organosols are well known in the plastic art.

Considering the nature of a plastisol for the body layer, it should be thixotropic. Preferably it should exhibit high viscosity at low shear rates and a low viscosity at high shear rates. When a body layer plastisol is deposited on the previously deposited surface layer, the body layer will tend to set up and become relatively stiff. When the fabric is applied to this plastisol body layer under very slight pressure, the shear rate is low so that the plastisol layer tends to remain set up and comparatively rigid. Thus, the fabric is not impregnated with plastisol nor is it pushed all the way into the plastisol.

A body layer plastisol is preferably capable of exhibiting a definite yield point both at room temperatures and at elevated temperatures. This is desirable so that the plastisol layer will not "wick" into the fabric during the subsequent heating in the oven. (By "yield point" I mean the shear stress existing at a very low shear rate. This is also a measure of the viscosity of the material at low shear rate.)

I find it desirable that a body layer plastisol containing the blowing agent and incompatible resin, have a viscosity of less than 14,000 but more than 8,000 centipoises when measured at 60 pounds per square inch by a Severs Rheometer using a nozzle of two inches length and 0.123 inch diameter. The Severs Rheometer is described in "Vinylite Dispersion Resins, Plastisols," published by the Bakelite Company, "Flow Properties of Plastigels," pages 6 and 7 (1952).

The viscosity of a body layer plastisol at low shear rates may be varied. In general, however, the plastisol should be of such nature as to require at least 0.5 minute for a descent of four inches in a Mobilometer (Gardner type) using a 474.0 gram weight on a Number 1 Disc. The Gardner Mobilometer is described in "The National Paint Dictionary" (Second Edition, July 1942) by J. R.

Stewart, at page 90. Preferably the No. 1 Disc should take about 1.0 minute for a four inch descent.

The following examples will further illustrate my invention. All parts are by weight unless otherwise indicated.

EXAMPLE I

A surface layer .004 inch thick of vinyl organosol was passed onto a casting paper and into an oven as previously described. The formulation was as follows:

| Ingredients: | Parts |
| --- | --- |
| Vinyl chloride polymer or copolymer (dispersion grade) | 100 |
| Di-2-ethyl hexyl phthalate | 80 |
| Xylol | 60 |
| Naphthenic or aliphatic hydrocarbon thinner | 40 |
| Powdered polyethylene (Microthene 620) | 25 |
| Ba-Cd-Zn stabilizer | 2 |

A body layer .009 inch thick (before expansion) of vinyl plastisol containing a blowing agent was thereafter disposed over the thin surface layer by means of a transfer roll as previously described. The body layer plastisol was formulated by first grinding the following formulation on a conventional three-roll mill:

| Ingredients: | Parts |
| --- | --- |
| Vinyl resin (polyvinyl chloride, V.R.–150) | 75 |
| Vinyl resin (copolymer of 95% vinyl chloride and 5% vinyl acetate, Pliovac AO) | 25 |
| Plasticizer (dioctyl phthalate) | 35 |
| Plasticizer (S–73 [1]) | 3 |
| Plasticizer (butyl benzyl phthalate) | 56 |
| Plasticizer (dioctyl azelate) | 12 |
| Aluminum stearate (1 part aluminum stearate and 7 parts dicapryl phthalate) | 8 |
| Stabilizers—lead type (Dythal, a dibasic lead phthalate, 2.6 parts; Plumb-O-Sil, a lead orthosilicate, 0.75 part) | 3.25 |
| Blowing agent, (p,p'-oxybis benzene sulfonyl hydrazide) | 3 |

[1] An epoxy-type plasticizer available from Rohm & Haas Company.

and then mixing therewith 15 parts of powdered polyethylene (Microthene 620). The aluminum stearate paste is present in this formulation as a thickening agent. For decorative effects, either or both of the organosol and plastisol formulations can be pigmented as desired.

In both the surface and body layer formulations in this example the polyethylene was dispersed in the compound utilizing minimum shear force to obtain a good dispersion of the powdered polyethylene in the plastisol by stirring about 15 to 30 minutes, depending on the size of the batch, in a Lightning mixer.

The fabric backing was lightly disposed over the surface of the body layer plastisol and the three-layer laminate was passed into an oven, as previously described, to thereby fuse the vinyl layers and secure adhesion between all three layers, decompose the blowing agent and melt the polyethylene in the intermediate body layer, and was then removed from the oven and the casting paper stripped therefrom, to thereby provide the leather-like breathable laminate of my invention. A finished coated fabric about 45 mils thick was produced.

The resulting porous laminate of this example, when tested to determine its porosity by means of a Gurley densometer made by W. & L. E. Gurley Company of Troy, N.Y., with a 1″ diameter hole and a cylinder weighing 568 grams exclusive of the sample, allowed 100 cubic centimeters of air to pass therethrough in 600 seconds. The Gurley Densometer and its use is further described in the aforesaid Dosmann United States patent application.

EXAMPLE II 100 parts of polyvinyl chloride resin, plastisol grade, was mixed with 65 parts of dicapryl phthalate plasticizer, 5 parts of epoxidized soy bean oil type plasticizer and 3 parts of cadmium barium zinc (Ba-Cd-Zn) stabilizer compound. To 100 parts of this plastisol was added 22 parts of Hi-Fax 601 polyethylene. These were mixed as described in Example I, and a surface layer of the mixture was cast on a casting paper by a reverse roll coater. The laminate was completed as described in Example I.

EXAMPLE III

A surface layer was cast on casting paper as described in Example I. A body layer formulation, as follows:

| Ingredients: | Parts by weight |
| --- | --- |
| Vinyl resin (poly vinylchloride, VR50) | 75 |
| Vinyl resin (copolymer of 95% vinyl chloride and 5% vinyl acetate, Pliovic AO) | 25 |
| Plasticizer (dioctyl phthalate) | 47 |
| Plasticizer (butyl benzyl phthalate) | 55 |
| Powdered polyethylene (Hi-Fax 601) | 15 |
| Stabilizer (barium-cadmium-zinc) | 4 |
| Thickener (lead orthosilicate) | 0.65 |
| Blowing agent (azodicarbonamide, celogen AZ) | 4 | was prepared as in Example I, a body layer was cast from this Example III formulation and the laminate otherwise completed, as in Example I.

From 10–60 parts by weight, and preferably from 15 to 40 parts of powdered polyethylene per 100 parts of resin may be used in the surface layer mixture, and from 10 to 30 parts of powdered polyethylene per 100 parts of resin may be used in the intermediate body layer mixture in the formulations according to this invention.

Additional changes may be made, for example, the amount of blowing agent may be decreased or increased by as much as fifty percent.

EXAMPLE IV

Polyol formulation 1

| | Parts by weight |
| --- | --- |
| Polytetramethylene ether glycol with a molecular weight of 2000 | 58 |
| Butadiene diol 1,4 | 8.5 |
| Isocyanate (143L—a low viscosity isocyanate manufactured by Upjohn) | 33.5 |
| Stannous octoate | 0.75 |
| Powder polyethylene (Microthene 620) | 25 |
| Blowing agent (p,p'-oxybis benzene sulfonyl hydrazide) | 2.9 |

The above polyol formulation, except for the isocyanate and blowing agent, was mixed in a Lightning mixer until smooth, about 15 minutes, to disperse the polyethylene therein. The well mixed compound was fed to a polyurethane dispenser of the basket mixing type, as was the isocyanate, where the two were mixed, and from which the mixture was dispersed to a 7 mil thick paper drawn through two bars with a 17 mil gap spacing between them so the polyol was spread on the paper in a thin film of gelled polyol formulation. It was next heated in a forced hot air oven (1300 to 1500 cubic feet of circulating air per minute) at 310° F. for 2 minutes after which it was removed. These steps were then repeated, but with the polyol containing the blowing agent and a gap setting of 38 mil when the paper containing the original film and the body layer was drawn therethrough. During this pass through the gap the body layer was applied over the thin layer, and thereafter a fabric was applied thereto before entering the oven. In the oven during the second two minute exposure at 210° F. the urethane was cured, the blowing agent decomposed and the polyethylene melted in the matrix. The film in the three layer laminate, after removal from the oven was now 23 mils thick and the blowing agent had been decomposed.

The resulting porous laminate, when tested on a Gurley densometer with a 1 inch diameter hole and a cylinder weighing 568 grams exclusive of the sample, allows 100 cu. centimeters of air to pass through the same in 15 seconds. When tested on a W 825 Honeywell moisture vapor transmission tester 2 seconds were required for 100 cc. of water vapor per square meter to pass therethrough.

Having thus described my invention, what I claim and desire to protect by Letters Patent is:

1. A process of making a leather-like, three-layer laminate capable of passing gases, comprising forming a thin surface layer from a substantially uniform mixture of a fluent organic plastic film forming material and a thermoplastic heat meltable resin incompatible therewith, forming on the thin layer a thicker layer from a substantially uniform mixture of a fluent organic plastic film forming material, a thermoplastic heat meltable resin incompatible therewith and a material adapted to generate a gas in the thicker layer and sponge the same, said incompatible resin in each said layer being in a physical form having a bulk density less than its actual density, applying a fabric to the surface of the thicker layer opposite said thin layer, forming the film forming material in each said layer into a matrix without bringing said incompatible resin to its melting point, sponging the film by generating a gas in the thicker layer, melting the incompatible material in the layer, forming the two layers of film forming material into a unitary film bonded to the fabric, and stretching and flexing the unitary film to increase its ability to pass gases.

2. A process according to claim 1 in which the film forming material in each said layer is a polyhydroxyl-terminated polymer and an organic diisocyanate,, and said incompatible material is polyethylene.

3. A process of making a leather-like, three-layer laminate, capable of passing gases, comprising forming a thin surface layer from a substantially uniform mixture of 100 parts of a fluent organic plastic film forming material and between about 10 and 60 parts of a thermoplastic heat meltable resin incompatible therewith, forming on the thin layer a thicker body layer from a substantially uniform mixture of 100 parts of a fluent organic plastic film forming material between about 10 and 50 parts of a thermoplastic heat meltable resin incompatible therewith and a material adapted to generate a gas in the thicker layer and sponge the same, said incompatible resin in each said layer being in a physical form having a bulk density less than its actual density, applying a fabric to the surface of the body layer opposite the thin layer, forming the film forming material in the two layers into a gelled matrix without bringing said incompatible resin to its melting point, sponging the body layer by generating a gas in the thicker layer, melting the incompatible material in the two layers, and forming the film forming material in the two layers into a unitary film bonded to the fabric.

4. A process according to claim 3 in which the film forming material in said body layer is a polyhydroxyl-terminated polymer and an organic diisocyanate, and in which the incompatible material in each said layer is polyethylene.

5. A process of making a leather-like, three-layer laminate capable of passing gases, comprising forming a thin surface layer from a substantially uniform mixture of a diluted plastisol-like mixture of 100 parts of vinyl resin and a plasticizer and between about 10 and 60 parts of polyethylene incompatible with said plastisol and heat-meltable at a temperature not above about the fusion temperature of the resin and plasticizer, forming on the thin layer a thicker body layer from a substantially uniform mixture of a plastisol-like mixture of 100 parts of vinyl resin and a plasticizer therefor, between about 10 and 30 parts of polyethylene heat-meltable at a temperature not above about the fusion temperature of the vinyl and plasticizer and a blowing agent, said polyethylene being incompatible with said plastisol-like mixture, said polyethylene being in the form of small particles having a mesh size between about 40 and about 250 mesh.

6. A method in accordance with claim 5 in which there is about 15 to 40 parts of polyethylene in said thin layer per 100 parts of vinyl resin, and the polyethylene in each such layer has a mesh size between about 120 and 160 mesh.

References Cited

UNITED STATES PATENTS

| 3,130,505 | 4/1964 | Markevitch | 161—159X |
| 3,196,062 | 7/1965 | Kristal | 156—79 |
| 2,983,960 | 5/1961 | Jilge | 156—155X |

FOREIGN PATENTS

| 858,910 | 1/1961 | Great Britain | 161—160 |

BENJAMIN R. PADGETT, Primary Examiner

S. HELLMAN, Assistant Examiner

U.S. Cl. X.R.
156—155; 161—160